US007540480B2

(12) United States Patent  (10) Patent No.: US 7,540,480 B2
Sawai et al. (45) Date of Patent: Jun. 2, 2009

(54) HYDRAULIC SHOCK ABSORBER (75) Inventors: Seiji Sawai, Shizuoka (JP); Yutaka Yamazaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/045,817

(22) Filed: Mar. 11, 2008

(65) Prior Publication Data

US 2008/0223673 A1    Sep. 18, 2008

(30) Foreign Application Priority Data

Mar. 12, 2007  (JP) .............................. 2007-061559

(51) Int. Cl.
*F16F 9/06* (2006.01)
(52) U.S. Cl. ........................................ 267/221; 267/34
(58) Field of Classification Search ................ 267/34, 267/221, 289, 291; 188/266.2–266.5, 300, 188/322.21
See application file for complete search history.

(56) References Cited

U.S. PATENT DOCUMENTS

| | | | | |
|---|---|---|---|---|
| 3,762,514 A | * | 10/1973 | Freitag | 188/300 |
| 4,099,602 A | | 7/1978 | Kourbetsos | |
| 4,318,536 A | * | 3/1982 | Bauer | 267/64.12 |
| 4,993,552 A | * | 2/1991 | Bugbey et al. | 206/307.1 |
| 5,097,928 A | * | 3/1992 | Enders et al. | 188/300 |
| 5,560,456 A | * | 10/1996 | Koch et al. | 188/300 |

FOREIGN PATENT DOCUMENTS

| | | |
|---|---|---|
| EP | 0 381 188 A2 | 8/1990 |
| EP | 1 054 185 A2 | 11/2000 |
| JP | 11-165521 A | 6/1999 |
| JP | 2004-232845 A | 8/2004 |
| WO | 2007/052581 A1 | 5/2007 |

OTHER PUBLICATIONS

Satou et al.: "Damper," U.S. Appl. No. 12/091,958, filed Apr. 29, 2008.
Official communication issued in counterpart European Application No. 08004623.8, mailed on Jul. 10, 2008.

* cited by examiner

*Primary Examiner*—Christopher P Schwartz
(74) *Attorney, Agent, or Firm*—Keating & Bennett, LLP (57) ABSTRACT A shock absorber includes a cylinder tube connected to one portion of a shock absorbing body, a main piston rod extending from a piston with its extension end being connected to another portion of the shock absorbing body, a sub piston rod extending from the piston, an oil chamber pressurizing device arranged to pressurize a hydraulic oil, and damping force generators arranged to generate a damping force by allowing the hydraulic oil to flow between first and second oil chambers. A sealed space for containing an extension end of the sub piston rod is provided. Gas having a pressure larger than atmospheric pressure and smaller than a pressure applied on the hydraulic oil by the oil chamber pressurizing device is filled in the sealed space.

4 Claims, 5 Drawing Sheets

HYDRAULIC SHOCK ABSORBER

BACKGROUND OF THE INVENTION

1. Field of the Invention

The present invention relates to a hydraulic shock absorber suspended between a wheel side which is a first portion of a shock absorbing body and a vehicle body side which is a second portion of the shock absorbing body, for absorbing an impact force supplied to the shock absorbing body in a case in which the shock absorbing body is, for example, included in a suspension system of an automobile.

2. Description of the Related Art

One conventional hydraulic shock absorber is disclosed in JP-A-2004-232845. According to the disclosed publication, the hydraulic shock absorber is a single-rod type including a cylinder tube connected to a first portion of a shock absorbing body which is a suspension system of an automobile; a free piston slidably fitted in the cylinder tube in the axial direction for dividing the cylinder tube into an oil chamber filled with hydraulic oil and a gas chamber filled with high-pressure gas; a piston slidably fitted in the oil chamber in the axial direction for dividing the oil chamber into first and second oil chambers; a piston rod projecting from the piston and extending to the outside of the cylinder tube through the first oil chamber located opposite to the gas chamber with its extension end being connected to a second portion of the shock absorbing body; and a damping force generator for generating a damping force with the hydraulic oil flowing between the first and second oil chambers.

In the above case, the gas chamber and the gas filled in the gas chamber function as an oil chamber pressurizing device for pressurizing the hydraulic oil in the first and second oil chambers. With the oil chamber pressurizing device, the occurrence of bubbles generated in the hydraulic oil due to the negative pressure in the first and second oil chambers when the shock absorber is operated or the volume of the hydraulic oil varies with a change in temperature can be prevented. Thereby, damping characteristics of the shock absorber can be better maintained.

A shock absorber used in a suspension system of an automobile is generally configured as follows. The cylinder tube is connected to the wheel side and the extension end of the piston rod is connected to the vehicle body side via a rubber mount. A suspension spring is provided between the cylinder tube and the vehicle body side for extending the shock absorber.

Each of the axial end surfaces of the piston is a pressure receiving surface which receives pressure from the hydraulic oil. In the single-rod type shock absorber described above, the pressure receiving area of one pressure receiving surface is larger than that of another pressure receiving surface from which the piston rod projects by the sectional area of the piston rod. Therefore, as described above, when the hydraulic oil is pressurized by the pressure of the gas of the oil chamber pressurizing device, the piston is urged in an extending direction of the piston rod by an urging force (R), which is a pressurized reaction force generated by the pressure of the hydraulic oil based on the oil chamber pressurizing device and the difference of the pressure receiving area described above. As a result, the single-rod type shock absorber has characteristics that normally cause the extension of the shock absorber in the free state.

Therefore, the vehicle body side weight (W) corresponding to the shock absorber is supported on the wheel side by the spring reaction force (F) of the suspension spring and is also supported on the wheel side by the urging force (R) of the oil chamber pressurizing device via the piston, the piston rod, and the rubber mount on the shock absorber (W=F+R). In this case, the urging force (R) urges the rubber mount upward. Therefore, for example, when the automobile is in a stationary state, an initial elastic deformation appears on the rubber mount in the upward extending direction caused by the urging force (R).

When the shock absorber makes a compression or extension movement with an impact force under conditions described above while the automobile is driven, it is preferable that the rubber mount elastically deforms with an elasticity as uniform as much as possible (desired elastic deformation) during each of the compression or extension movement.

If the rubber mount is a single element not provided with the shock absorber, the rubber mount is designed to have rubber mount characteristics such that when an upward load is applied, the rubber mount softly elastically deforms in the extension direction, while when a downward load is provided, the rubber mount stiffly elastically deforms in the compression direction. Thus, a lot of effort is made so that the rubber mount with the desired elastic deformation is obtained in each of the compression or extension movement of the shock absorber described above under the condition that there is an initial elastic deformation on the rubber mount caused by the urging force (R) in the stationary state of the automobile.

Meanwhile, another conventional hydraulic shock absorber is disclosed in JP-A-Hei11-165521. According to this publication, the hydraulic shock absorber is a double-rod type including a cylinder tube connected to a first portion of a shock absorbing body; a piston slidably fitted in the cylinder tube in an axial direction thereof for dividing the cylinder tube into first and second oil chambers; a main piston rod extending from the piston to the outside of the first oil chamber through the first oil chamber with its extension end being connected to a second portion of the shock absorbing body; a sub piston rod extending from the piston to the outside of the second oil chamber through the second oil chamber; an oil chamber pressurizing device for pressurizing the hydraulic oil in the first and second oil chambers; and a damping force generator for generating a damping force with the hydraulic oil flowing between the first and second oil chambers.

Recently, in a single-rod type shock absorber used in a suspension system of an automobile as described in JP-A-2004-232845, there is a case in which the diameter of the piston rod in the shock absorber is required to have an increased capacity and strength. When the diameter of the piston rod is increased, the urging force (R) increases in a rate corresponding to the increased area of the piston rod.

However, even though the urging force (R) in the shock absorber increases, it is not easy to obtain the desired rubber mount characteristics for achieving the desired elastic deformation on the rubber mount due to the limitations of the construction of the rubber mount and the limitations of its strength. Therefore, under the above situation, it is very difficult to practically achieve the desired elastic deformation.

Meanwhile, there may be a case in which a shock absorber is changed to a double-rod type as described in JP-A-Hei 11-165521, or a single-rod type shock absorber is used in a suspension system of an automobile described in JP-A 2004-232845 with the rubber mount unchanged.

However, in the pistons of the double-rod type shock absorber, each piston rod extends from each axial end surface to the outside of each cylinder tube. Accordingly, the pressure receiving area of each pressure receiving surface of the piston becomes generally equal. Therefore, though the oil chamber pressurizing device pressurizes the hydraulic oil, the urging force (R), which is a pressurized reaction force of the gas, is not generated. As a result, the piston is not urged toward either of the axial directions together with each piston rod. That is, the double-rod type shock absorber does not have characteristics that make the extension movement in the free state.

Therefore, as described above, when a double-rod type shock absorber is provided in a suspension system of an automobile to which a single-rod type shock absorber should be used, the vehicle-body side weight (W) is supported on the wheel side only by the spring reaction force (F) by the suspension spring and no urging force (R) of the single-rod type shock absorber is applied to the rubber mount. Therefore, the rubber mount stays in the free state and the initial elastic deformation generated by using the single-rod type shock absorber does not occur.

As a result, for example, when an impact force is applied to the shock absorber in its axial direction thereby making the compression movement while the automobile is running on a flat road, the rubber mount first starts to deform elastically from the free state, and the elastic deformation proceeds to reach the initial elastic deformation state. Then the rubber mount exhibits damping characteristics similar to those of the single-rod type shock absorber for the first time.

Therefore, in a case in which the double-rod type shock absorber is used instead of the single-rod type shock absorber with the rubber mount unchanged, a time lag occurs in generating a damping force, which makes the rubber mount characteristics unsuitable. This may cause deterioration of the riding comfort of the automobile, and therefore it is not preferred.

SUMMARY OF THE INVENTION

In order to overcome the problems described above, preferred embodiments of the present invention provide a hydraulic shock absorber which easily adjusts the urging force for urging a shock absorber so that the shock absorber normally makes an extension movement in the free state and thereby improves the adaptability of the shock absorber such that the shock absorber can be easily adapted to any type of rubber mount having various rubber mount characteristics such as, for example, a rubber mount that has rubber mount characteristics suitable for a single-rod type shock absorber in a suspension system of a vehicle.

A preferred embodiment of the present invention is directed to a hydraulic shock absorber preferably including a cylinder tube connected to a first portion of a shock absorbing body; a piston slidably fitted in the cylinder tube in an axial direction thereof for dividing the cylinder tube into first and second oil chambers; a main piston rod extending from the piston to the outside of the first oil chamber through the first oil chamber, the main piston rod having an extension end being connected to a second portion of the shock absorbing body; a sub piston rod extending from the piston to the outside of the second oil chamber through the second oil chamber; an oil chamber pressurizing device arranged to pressurize a hydraulic oil in the first and second oil chambers; and damping force generators arranged to generate a damping force by allowing the hydraulic oil to flow between the first and second oil chambers, wherein a sealed space containing the extension end of the sub piston rod includes a gas within the sealed space having a pressure larger than atmospheric pressure and smaller than a pressure applied on the hydraulic oil by the oil chamber pressurizing device.

According to another preferred embodiment of the present invention, the hydraulic shock absorber preferably includes an injection valve provided to inject or discharge the gas in or from the sealed space.

According to another preferred embodiment of the present invention, the cylinder tube may include a tube body extending in an axial direction thereof; a fixed rod guide fixed to the tube body in such a manner that an end opening in the first oil chamber positioned opposite to the piston is closed, the main piston rod 12 slidably passing through the fixed rod guide; and a movable rod guide slidably fitted in the tube body in an axial direction thereof in such a manner that an end opening in the second oil chamber positioned opposite to the piston is closed, the sub piston rod slidably passing through the movable rod guide, and in which a solid spring as the oil chamber pressurizing device for urging the movable rod guide toward the first and second oil chambers is provided in the sealed space.

According to another preferred embodiment of the present invention, the cylinder tube may include a tube body extending in an axial direction thereof; a fixed rod guide fixed to the tube body in such a manner that an end opening in the first oil chamber positioned opposite to the piston is closed, the main piston rod slidably passing through the fixed rod guide; and another fixed rod guide fixed to the tube body in such a manner that an end opening in the second oil chamber positioned opposite to the piston is closed, the sub piston rod slidably passing through the other fixed rod guide, and in which an accumulator as the oil chamber pressurizing device is arranged to pressurize the hydraulic oil in the first and second oil chambers by the pressure of a second gas.

The benefits and advantages of the various preferred embodiments of the present invention are described below.

A preferred embodiment described above includes a hydraulic shock absorber preferably having a cylinder tube connected to a first portion of a shock absorbing body; a piston slidably fitted in the cylinder tube in an axial direction thereof for dividing the cylinder tube into first and second oil chambers; a main piston rod extending from the piston to the outside of the first oil chamber through the first oil chamber, the main piston rod having an extension end being connected to a second portion of the shock absorbing body; a sub piston rod extending from the piston to the outside of the second oil chamber through the second oil chamber; an oil chamber pressurizing device arranged to pressurize a hydraulic oil in the first and second oil chambers; and damping force generators arranged to generate a damping force by allowing the hydraulic oil to flow between the first and second oil chambers, wherein a sealed space containing the extension end of the sub piston rod includes a gas within the sealed space having a pressure larger than atmospheric pressure and smaller than a pressure applied on the hydraulic oil by the oil chamber pressurizing device.

Therefore, an urging force is supplied to the extension end of the sub piston rod contained in the sealed space based on the cross-sectional area of the sub piston rod and the pressure of the gas. Accordingly, for example, when the diameters of the main piston rod and the sub piston rod are larger in order to change the capacity and strength of the shock absorber, the urging force can be adjusted by a relatively small value by decreasing the pressure of the gas on the other hand. That is, according to the present preferred embodiment, the urging force can be easily adjusted so that the shock absorber normally makes the extension movement in its free state only by adjusting the pressure of the gas in the sealed space. Thereby, the adaptability of the shock absorber can be advantageously improved.

As described above, the pressure of the gas filled in the sealed space is smaller than the pressure applied on the hydraulic oil by the oil chamber pressurizing device. Accordingly, fine adjustments of the urging force can be easily achieved by varying the pressure of the gas.

As a result, a rubber mount having all types of rubber mount characteristics such as, for example, a rubber mount that has rubber mount characteristics suitable for a single-rod type shock absorber in a suspension system of a vehicle can be easily adapted to the shock absorber.

A preferred embodiment of the present invention described above preferably includes an injection valve provided to inject or discharge the gas in or from the sealed space.

Therefore, the injection or discharge of the gas in or from the sealed space can be easily achieved by the injection valve. Thereby, adjustment of the pressure of the gas in the sealed space can be further easily achieved. Accordingly, fine adjustments of the urging force for urging the shock absorber in order to normally make the extension movement can be easily achieved, thereby further improving the adaptability of the shock absorber.

A preferred embodiment of the present invention described above preferably includes a cylinder tube preferably having a tube body extending in an axial direction thereof; a fixed rod guide fixed to the tube body in such a manner that an end opening in the first oil chamber positioned opposite to the piston is closed, the main piston rod slidably passing through the fixed rod guide; and a movable rod guide slidably fitted in the tube body in an axial direction thereof in such a manner that an end opening in the second oil chamber positioned opposite to the piston is closed, the sub piston rod slidably passing through the movable rod guide, and in which a solid spring as the oil chamber pressurizing device for urging the movable rod guide toward the first and second oil chambers is provided in the sealed space.

Therefore, the shock absorber can be constructed simply by using the solid spring, which has a simple construction and has no possibility of leaking fluid, as the oil chamber pressurizing device.

The spring is disposed in the sealed space as described above.

Thus, the sealed space for containing the gas is utilized for locating the spring, thereby making the shock absorber compact.

A preferred embodiment of the present invention described above preferably includes a cylinder tube preferably having a tube body extending in an axial direction thereof; a fixed rod guide fixed to the tube body in such a manner that an end opening in the first oil chamber positioned opposite to the piston is closed, the main piston rod slidably passing through the fixed rod guide; and another fixed rod guide fixed to the tube body in such a manner that an end opening in the second oil chamber positioned opposite to the piston is closed, the sub piston rod slidably passing through the other fixed rod guide, and in which an accumulator as the oil chamber pressurizing device is provided for pressurizing the hydraulic oil in the first and second oil chambers by the pressure of a second gas.

Therefore, the pressure which normally pressurizes the hydraulic oil can be easily adjusted by adjusting the pressure of the second gas in the accumulator, thereby easily obtaining a suitable shock absorber.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

A hydraulic shock absorber according to preferred embodiments of the present invention easily adjusts the urging force of the shock absorber so that the shock absorber normally makes an extension movement in a free state and thereby improves the adaptability of the shock absorber.

The hydraulic shock absorber preferably includes a cylinder tube connected to a first portion of a shock absorbing body; a piston slidably fitted in the cylinder tube in an axial direction thereof for dividing the cylinder tube into first and second oil chambers; a main piston rod extending from the piston to the outside of the first oil chamber through the first oil chamber with its extension end being connected to a second portion of the shock absorbing body; a sub piston rod extending from the piston to the outside of the second oil chamber through the second oil chamber; an oil chamber pressurizing device arranged to pressurize hydraulic oil in the first and second oil chambers; and a damping force generator arranged to generate a damping force with the hydraulic oil flowing between the first and second oil chambers. A sealed space for containing an extension end of the sub piston rod is provided. Gas having a pressure lager than atmospheric pressure and smaller than a pressure applied on the hydraulic oil by the oil chamber pressurizing device is filled in the sealed space.

First Preferred Embodiment

Description will be hereinafter made of a first preferred embodiment of the present invention in detail with reference to FIG. 1 of the accompanying drawings.

Figure 1:
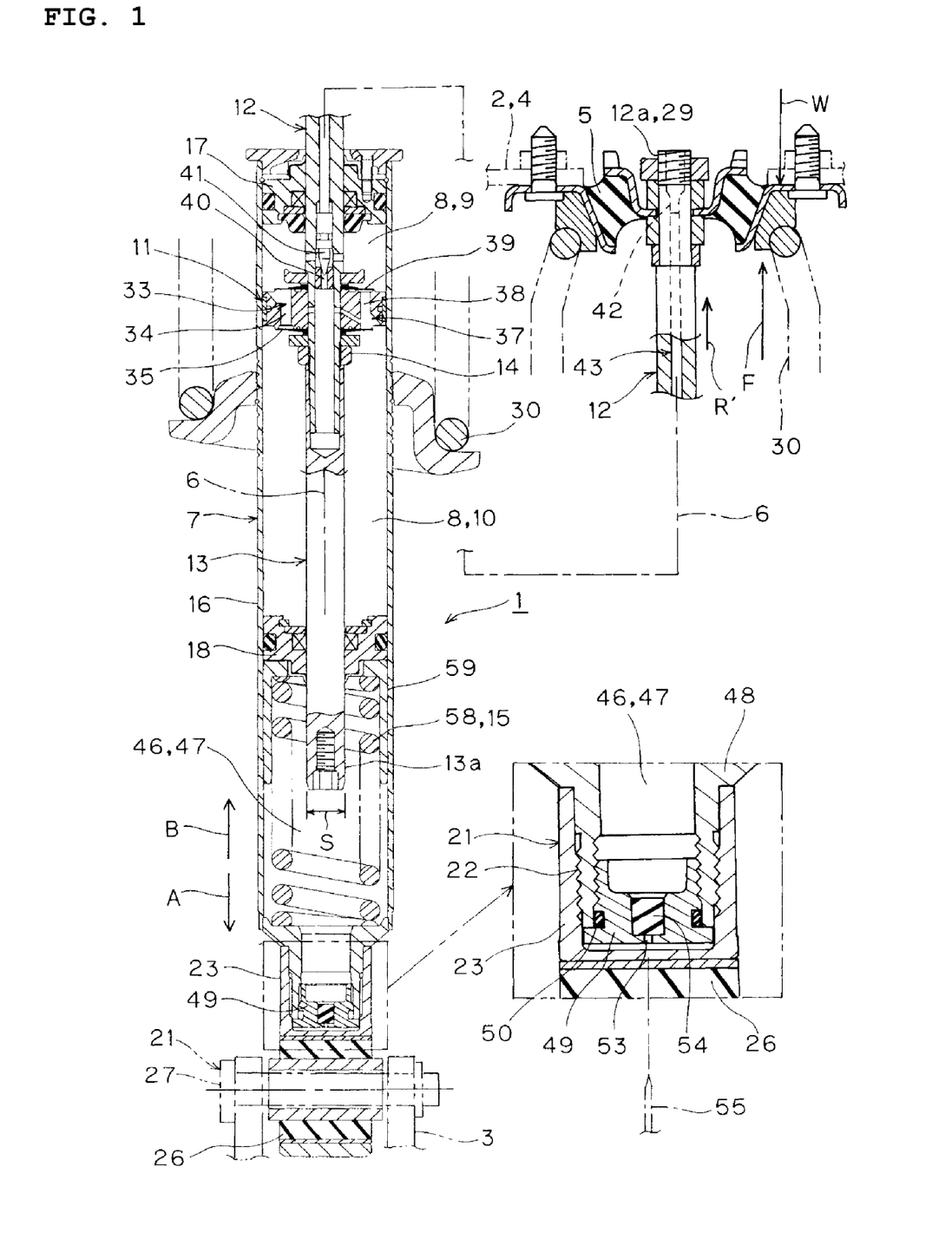
FIG. 1 is a side sectional and partially broken view of a shock absorber according to a first preferred embodiment of the present invention.

In FIG. 1, reference numeral 1 denotes a double-rod type hydraulic shock absorber. The shock absorber 1 is suspended between a first portion 3 and a second portion 4 of a shock absorbing body 2. The shock absorbing body 2 is, for example, a suspension system of a vehicle such as an automobile or a motorcycle. The first portion 3 is, for example, a wheel side and the second portion 4 is a vehicle body side. The shock absorber 1 and the second portion 4 are connected with each other by a rubber mount 5 interposed therebetween.

The shock absorber 1 preferably includes a cylinder tube 7 connected to the first portion 3 of the shock absorbing body 2 with its axis 6 extending vertically; a piston 11 slidably fitted in one end (upper end) of the cylinder tube 7 in an axial direction thereof for dividing the cylinder tube 7 into first and second oil chambers 9, 10 filled with hydraulic oil 8; a main piston rod 12 extending from the piston 11 to the outside of the first oil chamber 9 through the first oil chamber 9 with its extension end 12a connected to the second portion 4 of the shock absorbing body 2; a sub piston rod 13 extending from the piston 11 to the outside of the second oil chamber 10 through the second oil chamber 10; a fastener 14 arranged to detachably fix a proximal side of the sub piston rod 13 to the piston 11; and an oil chamber pressurizing device 15 arranged to pressurize the hydraulic oil 8 in the first and second oil chambers 9, 10.

The main and sub piston rods 12, 13 have generally the same diameter. Therefore, when each axial end surface of the piston 11 receives pressure from the hydraulic oil 8 in the first and second oil chambers 9, 10, the pressure receiving area facing the hydraulic oil 8 of each end surface of the piston 11 is generally equal.

The cylinder tube 7 preferably includes a cylindrical tube body 16 extending in an axial direction thereof; a fixed rod guide 17 fixed to the tube body 16 in such a manner that an end opening in the first oil chamber 9 positioned opposite to the piston 11 is closed, the main piston rod 12 slidably passing through the fixed rod guide 17; and a movable rod guide 18 slidably fitted in the tube body 16 in such a manner that an end opening in the second oil chamber 10 positioned opposite to the piston 11 is closed, the sub piston rod 13 slidably passing through the movable rod guide 18.

The lower end of the cylinder tube 7 is pivotally supported via a connector 21 on the first portion 3 of the shock absorbing body 2. The connector 21 preferably includes a connector body 23 detachably engaged with a male thread 22 provided at the lower end of the tube body 16; an absorbing body 26 fitted into a round hole provided in the connector body 23; and a pivot shaft 27 inserted into the absorbing body 26 for enabling the first portion 3 of the shock absorbing body 2 and the cylinder tube 7 to pivotally support each other.

On the other hand, the extension end 12a of the main piston rod 12 is connected to the second portion 4 of the shock absorbing body 2 by a fastener 29 via the rubber mount 5. If the rubber mount 5 is a single element not provided with the shock absorber 1, the rubber mount 5 preferably has rubber mount characteristics such that when an upward load is applied to the rubber mount 5, the rubber mount 5 softly makes elastic deformation in the extending direction, while when a downward load is applied, the rubber mount 5 stiffly makes elastic deformation in the compression direction.

The shock absorber 1 can make an extension movement A and a compression movement B by the piston 11 sliding relative to the cylinder tube 7. A suspension spring 30 is interposed between the second portion 4 of the shock absorbing body 2 and the cylinder tube 7 to enable the shock absorber 1 to make the extension movement A.

An extension side damping force generator 33 is arranged to generate a damping force by causing the hydraulic oil 8 to flow from the first oil chamber 9 to the second oil chamber 10 when the shock absorber 1 makes the extension movement A. The extension side damping force generator 33 preferably includes an extension side oil passage 34 provided in the piston 11 for communicating the first oil chamber 9 with the second oil chamber 10 and an extension side damping valve 35, which is preferably a leaf valve, attached to the piston 11 to resiliently open or close the extension side oil passage 34 from the second oil chamber 10 side.

On the other hand, when the shock absorber 1 makes the compression movement B, a compression side damping force generator 37 is arranged to generate a damping force by causing the hydraulic oil 8 to flow from the second oil chamber 10 to the first oil chamber 9. The compression side damping force generator 37 preferably includes a compression side oil passage 38 provided in the piston 11 for communicating the first oil chamber 9 with the second oil chamber 10; and a compression side damping valve 39, which is preferably a leaf valve, attached to the piston 11 to resiliently open or close the compression side oil passage 38 from the first oil chamber 9 side.

The extension side damping force generator 33 and the compression side damping force generator 37 each preferably include as common components a third oil passage 40 arranged between the piston 11 and the main piston rod 12 for communicating the first oil chamber 9 with the second oil chamber 10; an adjustment valve 41, which is preferably a needle valve, fitted in a hole provided along the axis 6 of the main piston rod 12 for adjusting an opening degree of a portion of the third oil passage 40 in the main piston rod 12; an engaging operation device 42 preferably in the shape of a plug screwed on the extension end 12a of the piston rod 12 for engagement with a tool; and an operation shaft 43 inserted in the hole along the axis 6 of the main piston rod 12. The opening degree of the third oil passage 40 can be adjusted by the adjustment valve 41 in conjunction with an operation by the tool on the engaging operation device 42 via the operation shaft 43.

A sealed space 46 for containing an extension end 13a of the sub piston rod 13 is preferably arranged below the movable rod guide 18. The sealed space 46 is preferably filled with nitrogen gas 47, of which pressure (about 0.5 Mpa to about 0.8 Mpa, for example) is larger than atmospheric pressure and smaller than a pressure (approximately 2 Mpa, for example) applied on the hydraulic oil 8 by the oil chamber pressurizing device 15. Filling and pressure adjustment of the gas 47 are generally carried out during the assembly process of the shock absorber 1. However, the shock absorber 1 may be adjusted in its assembled form without disassembling the components of the shock absorber 1 after the initial assembly the shock absorber 1, as described below.

Specifically, the extension end 13a of the sub piston rod 13 is disposed inside the lower portion of the cylinder tube 7. A cylindrical lid 48 with a smaller diameter than the cylinder tube 7 is fixed to the lower end of the cylinder tube 7. A plug 49 is screwed into an opening of the lid 48 along the axis 6. Thereby, the opening of the lid 48 is controlled to be opened or closed. An O-ring 50 provides a seal between an inner surface of the opening of the lid 48 and the plug 49. Thereby, the sealed space 46 is defined by the inside of the lower portion of the cylinder tube 7.

A through hole 53 is provided in the plug 49 along the axis 6. An injection valve 54 made of a rubber block is secured from the sealed space 46 side for closing the through hole 53. The injection valve 54 allows for the injection or discharge of the gas 47 in or from the sealed space 46.

Injection or discharge of the gas 47 for the sealed space 46 is preferably performed with a needle-shaped injector 55 which can be inserted in the injection valve 54. The injection or discharge of the gas 47 is performed in the state that the cylinder tube 7 is separated from the connector 21. Pressure of the gas 47 at the injector 55 can be detected by a pressure gauge and thereby the pressure of the gas 47 in the sealed space 46 can be adjusted to a desired pressure value.

The oil chamber pressurizing device 15 preferably includes a solid spring 58 for normally urging the movable rod guide 18 toward the first and second oil chambers 9, 10 and a cylindrical sliding member 59 interposed between the movable rod guide 18 and the solid spring 58 in the axial direction of the cylinder tube 7. The spring 58 is preferably a coil spring made of metal or plastic positioned along the axis 6 and interposed between the lid 48 and the sliding member 59.

The sliding member 59 is fitted without play in the tube body 16 to be slidable in the axial direction. An end surface of the sliding member 59 is in contact with an axial end surface of the movable rod guide 18, the end surface of the sliding member 59 being arranged substantially perpendicular to the axis 6.

Therefore, even though an axial end surface of the spring 58 abuts the other end surface of the sliding member 59 at a slight slant from a plane perpendicular to the axis 6 in the free state of the spring 58, slanting of the sliding member 59 with respect to the axis 6 due to the urging force of the spring 58 can be prevented. Accordingly, the movable rod guide 18 abutting the one end surface of the sliding member 59 is also prevented from slanting with respect to the axis 6 due to the urging force of the spring 58. As a result, smooth sliding of the movable rod guide 18 within the tube body 16 can be ensured.

In a case in which an external impact force is provided to the shock absorber 1 in its axial direction when the vehicle is driven, the shock absorber 1 makes the extension movement A by an urging force of the suspension spring 30. Then, the hydraulic oil 8 in the first oil chamber 9 flows to the second oil chamber 10 through the extension side oil passage 34 of the extension side damping force generator 33. At this time, the extension side damping valve 35 elastically deforms to open the valve due to the hydraulic pressure generated by the hydraulic oil 8 in the first oil chamber 9 exceeding an elastic urging force of the extension side damping valve 35. The hydraulic oil 8 then flows with resistance past the extension side damping valve 35 through the extension side oil passage 34 which is open, as described above. This flow generates the damping force which absorbs the impact force.

On the other hand, the shock absorber 1 makes the compression movement B when provided with an impact force against the urging force of the suspension spring 30. Then, the hydraulic oil 8 in the second oil chamber 10 flows to the first oil chamber 9 through the compression side oil passage 38 of the compression side damping force generator 37. At this time, the compression side damping valve 39 elastically deforms to open the valve by the hydraulic pressure generated by the hydraulic oil 8 in the second oil chamber 10 exceeding an elastic urging force of the compression side damping valve 39. The hydraulic oil 8 then flows with resistance past the compression side damping valve 39 through the compression side oil passage 38 which is open, as described above. This flow generates the damping force which absorbs the impact force.

When the shock absorber 1 makes the extension movement A or the compression movement B as described above, the hydraulic oil 8 also flows between the first and second oil chambers 9, 10 through the third oil passage 40. These flows also generate the damping force which absorbs the impact force. In this case, the damping force generated by the extension movement A or the compression movement B of the shock absorber 1 can be adjusted by adjusting the opening degree of the third oil passage 40 with the adjustment valve 41 by the operation of the engaging operation device 42.

Incidentally, the hydraulic oil 8 in the first and second oil chambers 9, 10 is normally pressurized by the urging force of the spring 58 via the movable rod guide 18. Thereby, the occurrence of such a problem that bubbles are generated in the hydraulic oil 8 due to the negative pressure in the first and second oil chambers 9, 10 when the shock absorber 1 is operated or the volume of the hydraulic oil 8 varies with a change in temperature can be prevented. Thereby, damping characteristics of the shock absorber 1 can be better maintained.

In the above construction, the sealed space 46 for containing the extension end 13a of the sub piston rod 13 is provided, and the gas 47 having a pressure larger than atmospheric pressure and smaller than the pressure applied on the hydraulic oil 8 by the oil chamber pressurizing device 15 is filled in the sealed space 46.

Therefore, an urging force (R') is provided on the extension end 13a of the sub piston rod 13 contained in the sealed space 46 based on values of the cross-sectional area S of the sub piston rod 13 and the pressure of the gas 47. Accordingly, when the diameters of the main piston rod 12 and the sub piston rod 13 are larger in order to change the capacity and strength of the shock absorber 1, for example, the urging force (R') can be adjusted by a relatively small value by decreasing the pressure of the gas 47 on the other hand. That is, according to the above preferred embodiment, the urging force (R') for urging the shock absorber 1 to normally make the extension movement in its free state can be easily adjusted only by adjusting the pressure of the gas 47 in the sealed space 46. Thereby, the adaptability of the shock absorber 1 can be advantageously improved.

As described above, the pressure of the gas 47 filled in the sealed space 46 is smaller than the pressure applied on the hydraulic oil 8 by the oil chamber pressurizing device 15. Accordingly, fine adjustments of the urging force (R') can be easily achieved by varying the pressure of the gas 47.

According to the shock absorber 1 of the present preferred embodiment, the vehicle body side weight (W), which corresponds to the second portion 4 of the vehicle, is supported on the wheel side, which corresponds to the first portion 3 of the vehicle, by the spring reaction force (F) of the suspension spring 30, and is also supported on the wheel side by the urging force (R') (R'<R described above) generated by the pressure of the gas 47 via the piston 11, the main piston rod 12, and the rubber mount 5 on the shock absorber 1 (W=F+R'). In this case, the urging force (R') urges the rubber mount 5 upward. Therefore, for example, when the vehicle is in a stationary state, an initial elastic deformation appears on the rubber mount 5 in the upward pulling direction caused by the urging force (R').

When an impact force is applied to the shock absorber 1 in its axial direction while the vehicle is driven, the shock absorber 1 makes the extension movement A or the compression movement B under the conditions described above. For example, when an impact force is applied to the shock absorber 1 in its axial direction thereby making the compression movement B while the vehicle is driving on a flat road, the urging force (R') generates the initial elastic deformation on the rubber mount 5. As a result, the spring reaction force of the rubber mount 5 rapidly responds to the compression movement B and the piston 11 responsively slides in the cylinder tube 7. Accordingly, the hydraulic oil 8 responsively flows between the first and second oil chambers 9, 10 through the damping force generators 33, 37. Thereby, this flow generates the damping force which absorbs the impact force. This function is similar to that in the case a single-rod type shock absorber is used.

As a result, the rubber mount 5 which may have various rubber mount characteristics, such as, a rubber mount 5 that has rubber mount characteristics suitable for a single-rod type shock absorber 1 in a suspension system on a vehicle, can be easily adapted to the shock absorber 1.

Also, as described above, the injection valve 54 is provided for achieving injection or discharge of the gas 47 in or from the sealed space 46.

Therefore, injection or discharge of the gas 47 in or from the sealed space 46 can be easily achieved by the injection valve 54. Thereby, adjustment of the pressure of the gas 47 in the sealed space 46 can be further easily achieved. Accordingly, fine adjustments of the urging force for urging the shock absorber 1 to normally make the extension movement can be easily achieved, thereby further improving the adaptability of the shock absorber 1.

As described above, the cylinder tube 7 preferably includes the tube body 16 extending in an axial direction thereof; the fixed rod guide 17 fixed to the tube body 16 in such a manner that an end opening in the first oil chamber 9 positioned opposite to the piston 11 is closed, the main piston rod 12 slidably passing through the fixed rod guide 17; and a movable rod guide 18 slidably fitted in the tube body 16 in an axial direction thereof in such a manner that an end opening in the second oil chamber 10 positioned opposite to the piston 11 is closed, the sub piston rod 13 slidably passing through the movable rod guide 18. Also, as the oil chamber pressurizing device 15, the solid spring 58 for normally urging the movable rod guide 18 toward the first and second oil chambers 9, 10 is provided in the sealed space 46.

Therefore, the shock absorber 1 can be constructed simply by using the solid spring 58, which has a simple construction with no possibility of leaking fluid, as the oil chamber pressurizing device 15.

Furthermore, the spring 58 is disposed in the sealed space 46.

Thus, the sealed space 46 for containing the gas 47 is utilized for locating the spring 58, thereby making the shock absorber 1 compact.

The above description is based on an illustrated example. However, the shock absorber 1 may be arranged upside down, horizontally, or slanted. Also, the damping force generator may have a fixed orifice or the like provided outside the cylinder tube 7. The sealed space 46 may be defined separately from the cylinder tube 7. Injection or discharge of the gas 47 in or from the sealed space 46 may be performed only during initial assembly, and may be inhibited for the user by omitting the injection valve 54, for example.

FIGS. 2 to 5 illustrate second to fifth preferred embodiments of the present invention. The components, functions, and effects of these preferred embodiments are similar in many respects to those of the first preferred embodiment above. Therefore, those elements corresponding to the components in the first preferred embodiment are identified with the same reference numerals and symbols in the drawings and their description is not repeated, and their differences are mainly described below. The arrangements of the elements of the preferred embodiments may be combined in various ways.

Second Preferred Embodiment

Description will be hereinafter made of the second preferred embodiment of the present invention in detail with reference to FIG. 2 attached hereto.

Figure 2:
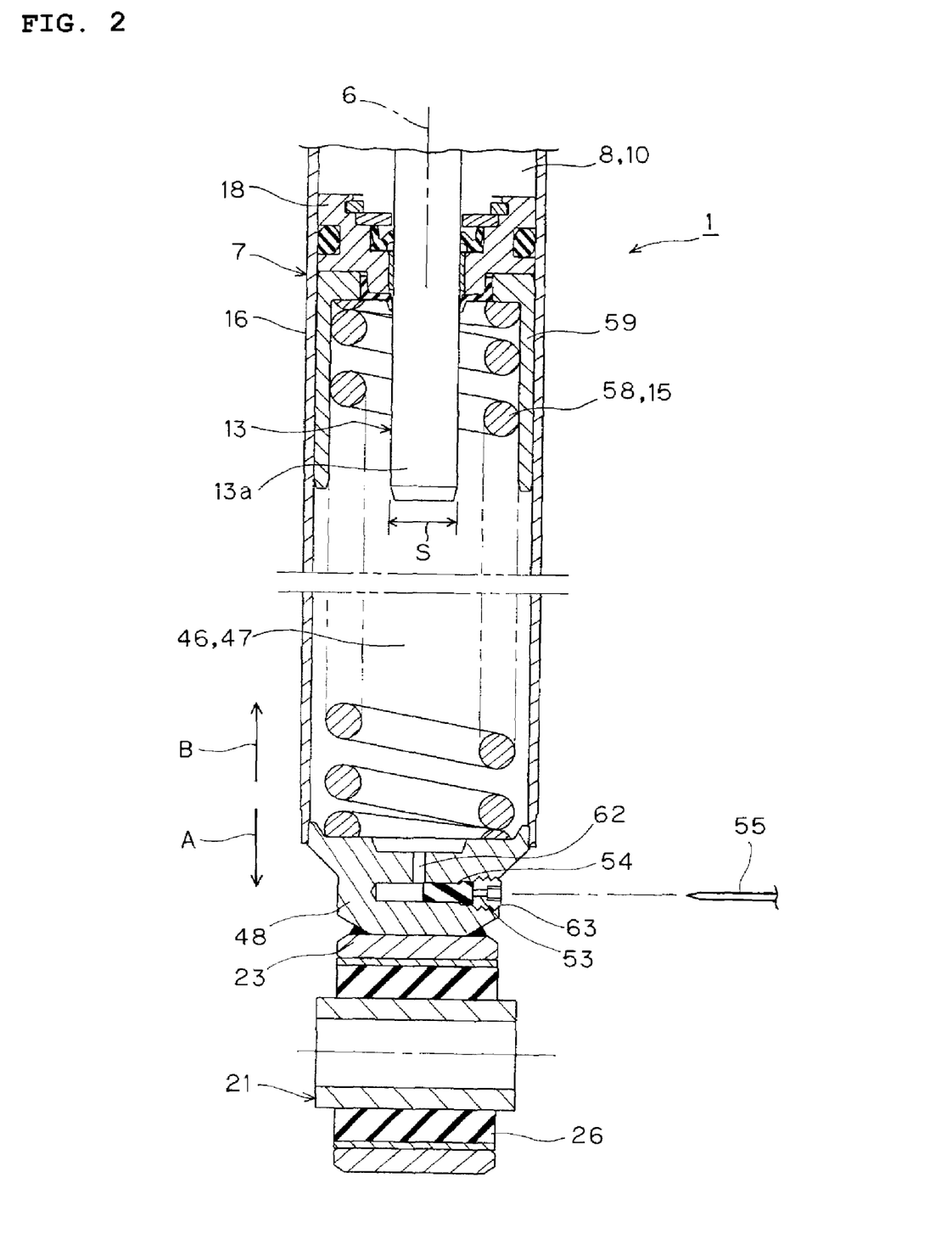
FIG. 2 is a view corresponding to FIG. 1, showing a second preferred embodiment of the present invention.

In FIG. 2, the lid 48 is fixed to the lower end of the cylinder tube 7 in order to close the opening thereof. A connector body 23 of the connector 21 is fixed to the lid 48. A gas passage 62 is provided in the lid 48 for communicating the inside of the sealed space 46 with the outside.

The injection valve 54 is pressed into the gas passage 62 at the outside end of the sealed space 46 and a plug 63 provided with the through hole 53 is detachably screwed in the end opening of the gas passage 62. An axis of the through hole 53 is generally perpendicular to the axis 6.

Third Preferred Embodiment

Description will be hereinafter made of the third preferred embodiment of the present invention in detail with reference to FIG. 3 attached hereto.

Figure 3:
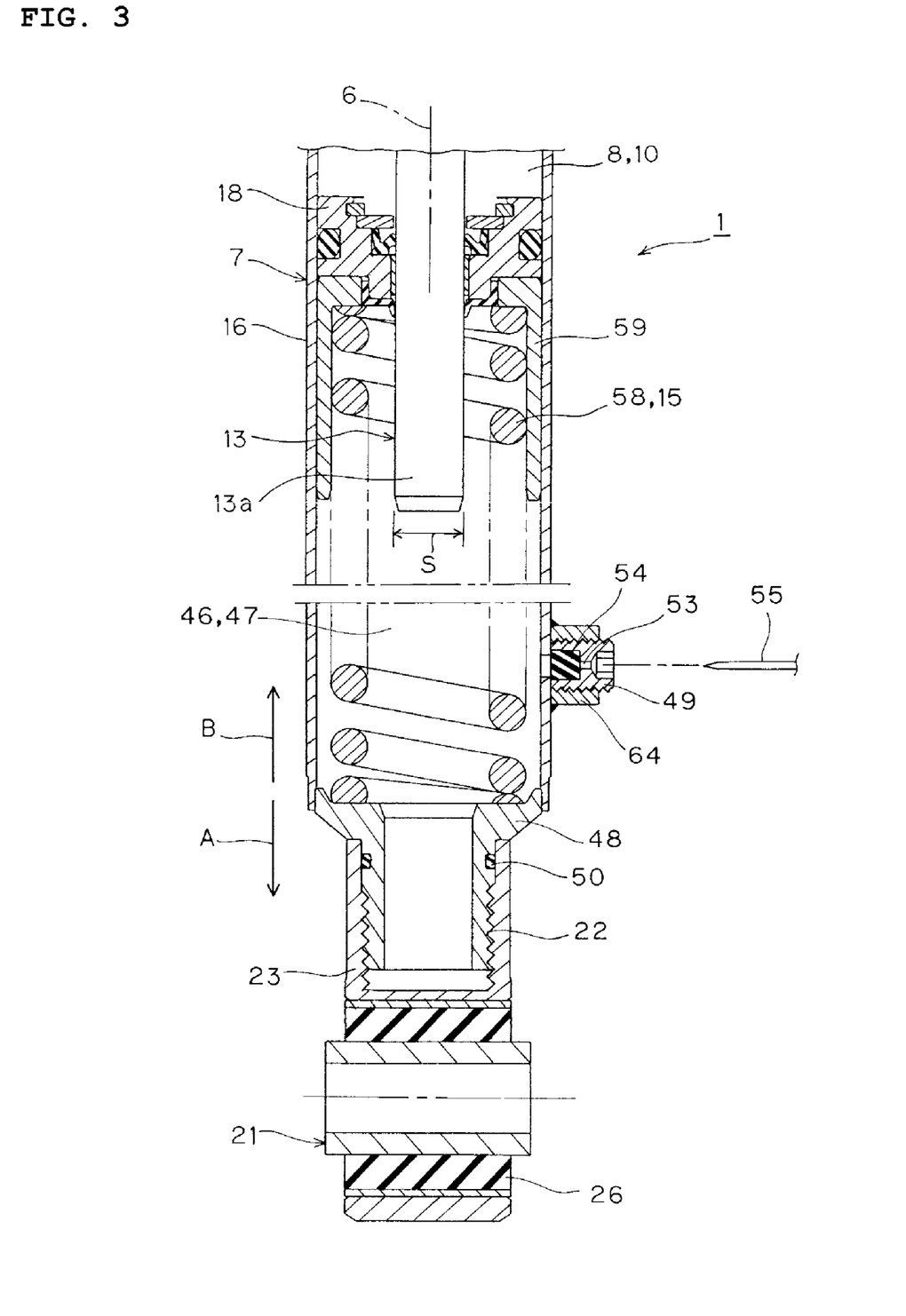
FIG. 3 is a view corresponding to FIG. 1, showing a third preferred embodiment of the present invention.

In FIG. 3, a hole is provided on a lower wall of the cylinder tube 7 which defines the sealed space 46. A socket 64 is fixed on the lower sidewall to be communication with the hole. The injection valve 54 is pressed into the socket 64 and a plug 49 provided with the through hole 53 is screwed into the socket 64. An axis of the through hole 53 is generally perpendicular to the axis 6.

Fourth Preferred Embodiment

Description will be hereinafter made of the fourth preferred embodiment of the present invention in detail with reference to FIG. 4 attached hereto.

Figure 4:
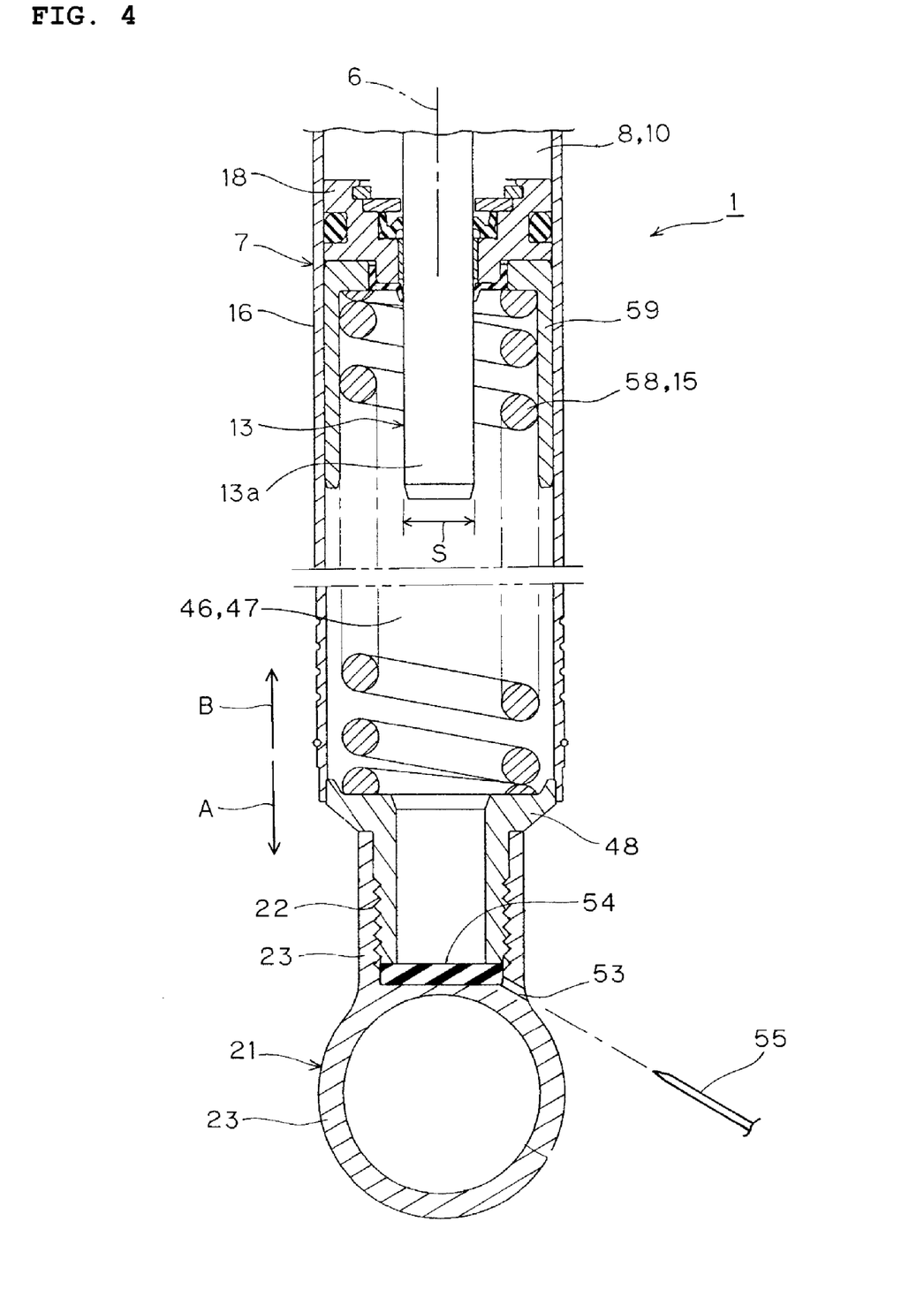
FIG. 4 is a view corresponding to FIG. 1, showing a fourth preferred embodiment of the present invention.

In FIG. 4, the through hole 53 is provided in the connector body 23 and the injection valve 54 is sandwiched between the lid 48 and the connector body 23 of the connector 21. The injection valve 54 provides a seal between the lid 48 and the connector body 23. An axis of the through hole 53 extends obliquely upward toward the injection valve 54.

Fifth Preferred Embodiment

Description will be hereinafter made of the fifth preferred embodiment of the present invention in detail with reference to FIG. 5 attached hereto.

Figure 5:
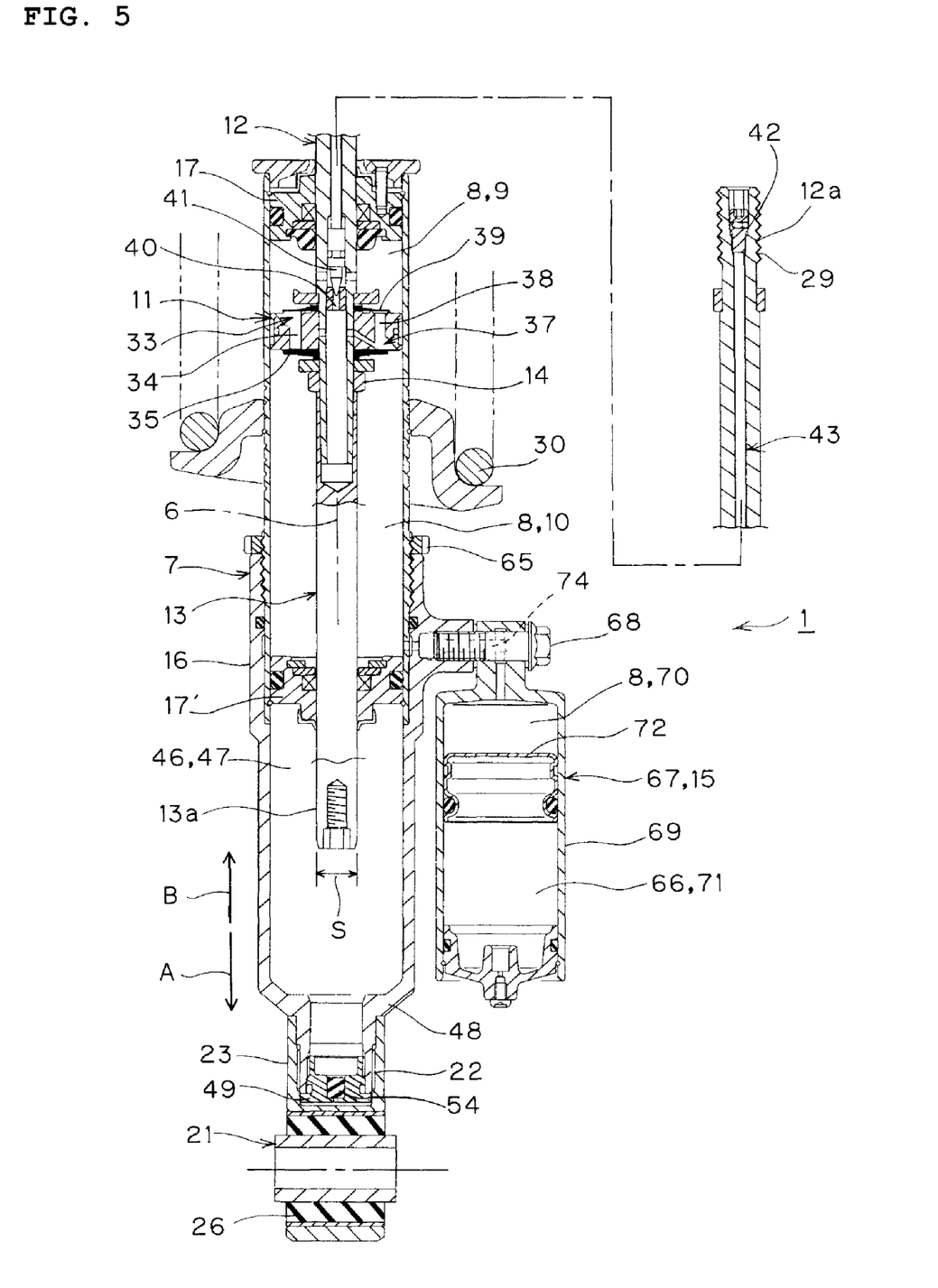
FIG. 5 is a view corresponding to FIG. 1, showing a fifth preferred embodiment of the present invention.

In FIG. 5, tube body 16 is separated into upper and lower tubes. Separate ends thereof are engaged with each other and fixed by a fastener 65. The movable rod guide 18 in the first preferred embodiment is replaced with another fixed rod guide 17' which is instead fixed on the tube body 16. An accumulator 67 is provided for pressurizing the hydraulic oil 8 in the first and second oil chambers 9, 10 with another gas 66 as the oil chamber pressurizing device 15. The accumulator 67 is fixed to the cylinder tube 7 by a fastener 68.

The accumulator 67 includes another cylinder tube 69 provided outside the cylinder tube 7 and a free piston 72 slidably fitted in the cylinder tube 69 in an axial direction thereof for dividing the cylinder tube 69 into an oil chamber 70 and a gas chamber 71. The oil chamber 70 is filled with the hydraulic oil 8 and is in communication with the second oil chamber 10 through an oil passage 74 provided in a bolt of the fastener 68. The other gas 66, which is preferably a high-pressure (approximately 2 Mpa) nitrogen gas, is contained in the gas chamber 71 and pressurizes the hydraulic oil 8 in the first and second oil chambers 9, 10 via the free piston 72.

With the above construction, the pressure which normally pressurizes the hydraulic oil 8 can be easily adjusted by adjusting the pressure of the other gas 66 in the accumulator 67, thereby easily obtaining an advantageous shock absorber 1.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A hydraulic shock absorber comprising:
a cylinder tube arranged to be connected to a first portion of a shock absorbing body;
a piston slidably fitted in the cylinder tube in an axial direction thereof to divide the cylinder tube into first and second oil chambers;
a main piston rod extending from the piston to the outside of the first oil chamber through the first oil chamber, the main piston rod having an extension end arranged to be connected to a second portion of the shock absorbing body;

a sub piston rod extending from the piston, the sub piston rod including an extension end extending to the outside of the second oil chamber through the second oil chamber;

an oil chamber pressurizing device arranged to pressurize a hydraulic oil in the first and second oil chambers; and a damping force generator arranged to generate a damping force by allowing the hydraulic oil to flow between the first and second oil chambers; wherein a sealed space containing the extension end of the sub piston rod includes a gas within the sealed space having a pressure larger than atmospheric pressure and smaller than a pressure applied on the hydraulic oil by the oil chamber pressurizing device.

2. The hydraulic shock absorber according to claim 1, further comprising an injection valve arranged to inject or discharge the gas in or from the sealed space.

3. The hydraulic shock absorber according to claim 1, wherein the cylinder tube includes:

a tube body extending in an axial direction thereof;

a fixed rod guide fixed to the tube body and arranged to close an end opening in the first oil chamber positioned opposite to the piston, the main piston rod slidably passing through the fixed rod guide; and a movable rod guide slidably fitted in the tube body in an axial direction thereof and arranged to close an end opening in the second oil chamber positioned opposite to the piston, the sub piston rod slidably passing through the movable rod guide; wherein the oil chamber pressurizing device includes a solid spring provided in the sealed space for normally urging the movable rod guide toward the first and second oil chambers.

4. The hydraulic shock absorber according to claim 1, wherein the cylinder tube includes:

a tube body extending in an axial direction thereof;

a first fixed rod guide fixed to the tube body and arranged to close an end opening in the first oil chamber positioned opposite to the piston, the main piston rod slidably passing through the first fixed rod guide; and a second fixed rod guide fixed to the tube body arranged to close an end opening in the second oil chamber positioned opposite to the piston, the sub piston rod slidably passing through the second fixed rod guide; wherein the oil chamber pressurizing device includes an accumulator arranged to pressurize the hydraulic oil in the first and second oil chambers by a pressure of a second gas.

* * * * *